US012780366B2

(12) United States Patent
Chiu

(10) Patent No.: US 12,780,366 B2
(45) Date of Patent: Nov. 3, 2026

(54) SWIVEL JOINT OF SURFBOARD LEASH

(71) Applicant: Chen-Yu Chiu, Chiayi City (TW)

(72) Inventor: Chen-Yu Chiu, Chiayi City (TW)

(*) Notice: Subject to any disclaimer, the term of this patent is extended or adjusted under 35 U.S.C. 154(b) by 375 days.

(21) Appl. No.: 18/413,778

(22) Filed: Jan. 16, 2024

(65) Prior Publication Data

US 2025/0229872 A1 Jul. 17, 2025

(51) Int. Cl.
*B63B 32/73* (2020.01)
*F16G 15/08* (2006.01)

(52) U.S. Cl.
CPC .............. *B63B 32/73* (2020.02); *F16G 15/08* (2013.01)

(58) Field of Classification Search
CPC ................................ B63B 32/73; F16G 15/08
See application file for complete search history.

(56) References Cited

U.S. PATENT DOCUMENTS 3,931,656 A * 1/1976 Thomson ................ B63B 32/70 441/75
4,044,415 A * 8/1977 Wood ...................... B63B 32/73 441/75
4,234,990 A * 11/1980 Colburn .................. B63B 32/70 441/75
4,285,083 A * 8/1981 Wilson .................... B63B 32/77 441/75
4,610,634 A * 9/1986 Kimura ................... B63B 32/70 441/75
5,194,026 A * 3/1993 Corwin ................... B63B 32/70 441/75
5,324,220 A * 6/1994 Stewart ................... B63B 32/20 119/770
6,000,979 A * 12/1999 Stewart ................... B63B 32/22 441/75
6,471,560 B2 * 10/2002 Kerckhoff ............... B63B 32/70 441/75
10,081,415 B1 * 9/2018 Sun ......................... B63C 11/04
11,273,888 B2 * 3/2022 West ........................ B63B 32/73
2002/0132538 A1 * 9/2002 Hufham .................. B63B 32/73 441/75
2015/0274265 A1 * 10/2015 Falken .................... B63B 32/73 441/75
2023/0000217 A1 * 1/2023 Allevato, III ........ A44B 99/005

FOREIGN PATENT DOCUMENTS

JP 2008207786 A * 9/2008 ............. B63B 21/00
JP 2019513908 A * 5/2019 ............... D07B 1/04

* cited by examiner

*Primary Examiner* — Marc Q Jimenez
*Assistant Examiner* — Jovon E Hayes
(74) *Attorney, Agent, or Firm* — HDLS IPR SERVICES; Chun-Ming Shih

(57) ABSTRACT

The present invention provides a swivel joint of a strap-type leash, wherein one end of the strap-type leash connects to one end of a rope through a first connector, the other end of the rope connects to a rail protection band through a second connector, and the rail protection band is configured with a hooking string for hooking a surfboard. The first connector includes a first rotating handle, wherein one end of the first rotating handle is configured with a first ball bearing, and the other end of the first rotating handle is configured with a first fastening hole. The first connector further includes a first joint portion, wherein the first joint portion is configured with a cavity to accommodate the first ball bearing for rotating the first rotation handle in three dimensions, and a plurality of rings are configured around an outer side of the first joint portion.

2 Claims, 4 Drawing Sheets

SWIVEL JOINT OF SURFBOARD LEASH

FIELD OF THE INVENTION

The present invention relates to a joint of a leash, especially a swivel joint of a leash capable of a three-dimensional rotation.

BACKGROUND OF THE INVENTION

Conventionally, as shown in FIG. 1, one end of the strap-type leash 1 chains the ankle or the knee of the surfer, and the other end of the strap-type leash 1 is connected to one end of the rope 5 through the connector 2. The other end of the rope 5 is connected to the rail protection band 3 through another connector 2. The rail protection band 3 has a hooking string 4 for hooking the surfboard.

As shown in FIG. 1, a circular supporting bearing 6 is accommodated in the internal cavity of the connector 2, and the supporting bearing 6 is limited to a two-dimensional rotation, such as rotating in a two dimensional plane formed by the x-axis and the y-axis. Therefore, because of the inability of rotating in three dimensions, when facing the strong momentum caused by the changes of the wave types, the connector 2 may not help the surfers to have a better sense of balance, and it is also difficult to mitigate the instantaneous tension, which may cause the surfers experience less comfort.

SUMMARY OF THE INVENTION

The present invention provides a swivel joint of a leash, having a strap-type leash, wherein one end of the strap-type leash connects to one end of a rope through a first connector, the other end of the rope connects to a rail protection band through a second connector, the rail protection band is configured with a hooking string for hooking a surfboard, characterized in that the first connector includes: a first rotating handle, wherein one end of the first rotating handle is configured with a first ball bearing, and the other end of the first rotating handle is configured with a first fastening hole; and first joint portion, wherein the first joint portion is configured with a cavity to accommodate the first ball bearing for rotating the first rotation handle in three dimensions, and a plurality of rings are configured around an outer side of the first joint portion.

Preferably, the second connector includes: a second rotating handle, wherein one end of the second rotating handle is configured with a second ball bearing, and the other end of the second rotating handle is configured with a second fastening hole; and a second joint portion, wherein the second joint portion is configured with a cavity therein to accommodate the second ball bearing for rotating the second rotation handle in three dimensions, and a plurality of rings are configured around an outer side of the second joint portion.

In summary of the above, the swivel joint of the present invention has a three-dimensional rotating structure that can make the surfers more comfortable and balanced. The swivel joint of the present invention overcomes the drawbacks in the prior art, where the connectors are not capable of rotating in three dimensions. Such that, the swivel joint may help the surfers to have a better sense of balance and may mitigate the instantaneous tension easily. Therefore, the surfers may experience more comfort.

DETAILED DESCRIPTION OF THE INVENTION

Figure 2:
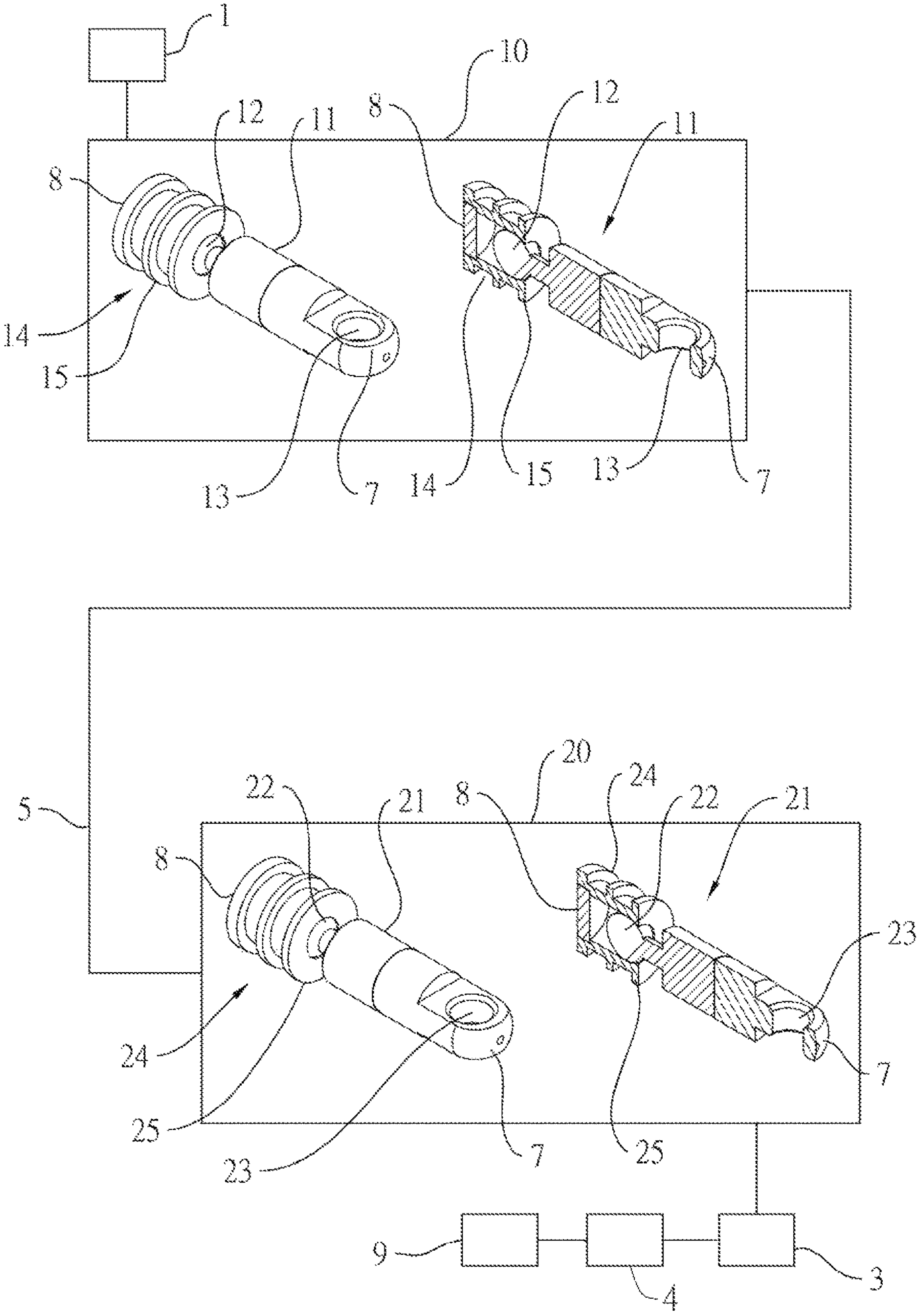
FIG. 2 is an enlarged schematic diagram of the swivel joint of the leash in one embodiment of the present invention.

As shown in FIG. 2, FIG. 2 is an enlarged schematic diagram of the swivel joint of the leash in one embodiment of the present invention. The swivel joint of the leash includes a strap-type leash 1 having one end connecting to a rope 5 through a first connector 10. The other end of the rope 5 connects to a rail protection band 3 through a second connector 20. The rail protection band 3 is configured with a hooking string 4 for hooking a surfboard 9. The first connector 10 includes a first rotating handle 11. One end of the first rotating handle 11 is configured with a first ball bearing 12, and the other end of the first rotating handle 11 is configured with a first fastening hole 13. The first connector 10 also includes a first joint portion 14. The first joint portion 14 is configured with a cavity to accommodate the first ball bearing 12 capable of a three-dimensional rotation. A plurality of rings 15 are configured around an outer side of the first joint portion 14. The strap-type leash 1 is configured to hook the surfer's ankle or knee portion. For example, the strap-type leash 1 is configured with Velcro. A schematic diagram and a cross-sectional view of the first connector 10 are also shown in FIG. 2.

Figure 3:
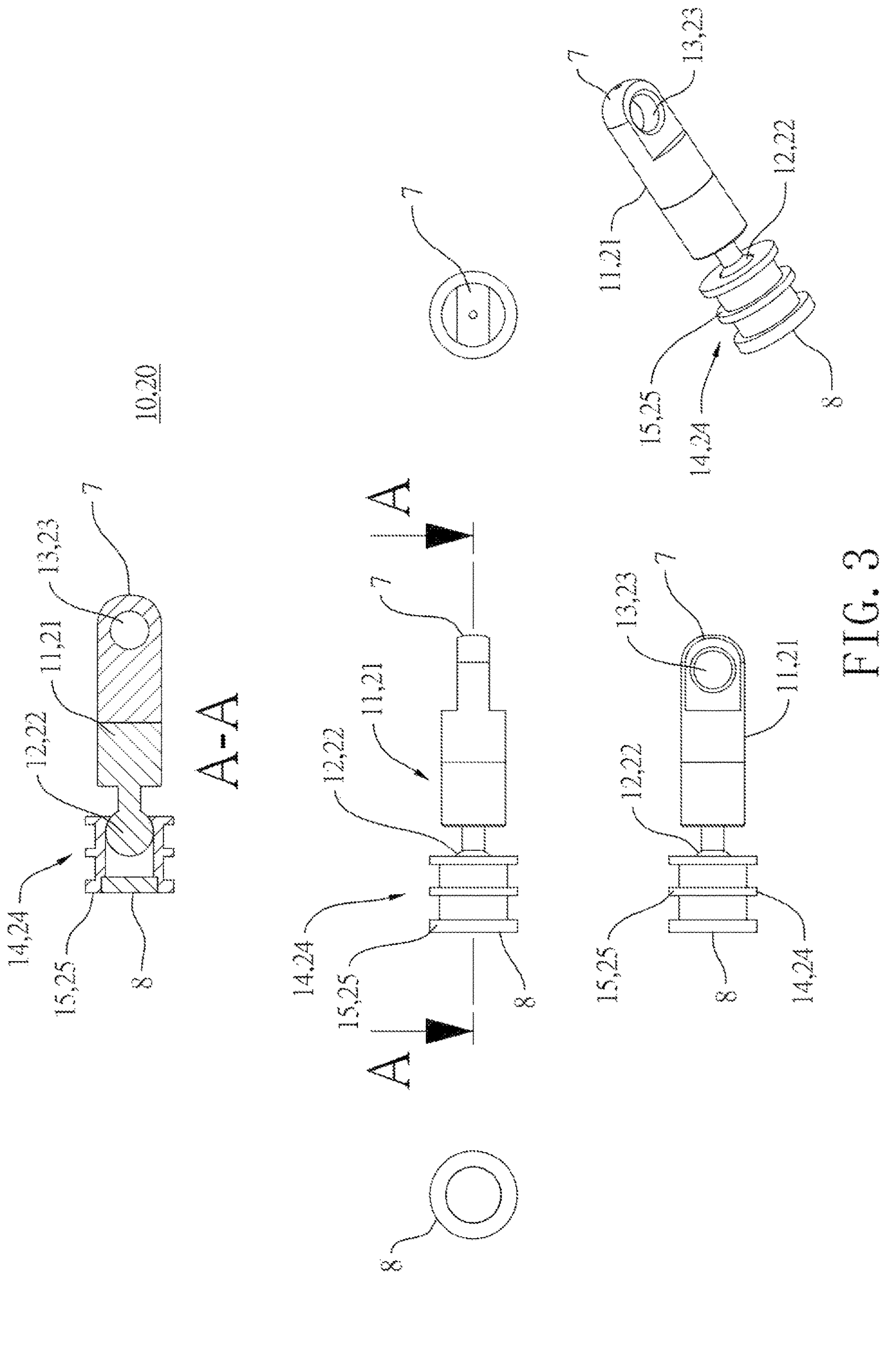
FIG. 3 is a schematic diagram of the swivel joint of the leash, which the first connector of the swivel joint and the second connector of the swivel joint has the same structure, in one embodiment of the present invention.

As shown in FIG. 2 and FIG. 3, FIG. 2 and FIG. 3 are schematic diagrams of the swivel joint of the leash in one embodiment of the present invention. The first connector 10 of the swivel joint of the leash has a top portion 7 and a bottom portion 8, which can be seen in the top view and bottom view, respectively. The first connector 10 includes the first rotating handle 11. One end of the first rotating handle 11 is configured with the first ball bearing 12, and the other end of the first rotating handle 11 is configured with the first fastening hole 13. The first connector 10 also includes the first joint portion 14. The first joint portion 14 is configured with the cavity to accommodate the first ball bearing 12 capable of the three-dimensional rotation. The plurality of rings 15 are configured around the outer side of the first joint portion 14.

As shown in FIG. 2 and FIG. 3, FIG. 2 and FIG. 3 are schematic diagrams of the swivel joint of the leash in one embodiment of the present invention. A second connector 20 of the swivel joint of the leash has a top portion 7 and a bottom portion 8, which can be seen in the top view and bottom view respectively. The second connector 20 includes a second rotating handle 21. One end of the second rotating handle 21 is configured with a second ball bearing 22, and the other end of the second rotating handle 21 is configured with a second fastening hole 23. The second connector 20 also includes a second joint portion 24. The second joint portion 24 is configured with a cavity to accommodate the second ball bearing 12 capable of the three-dimensional rotation. The plurality of rings 15 are configured around the outer side of the second joint portion 24.

Figure 1:
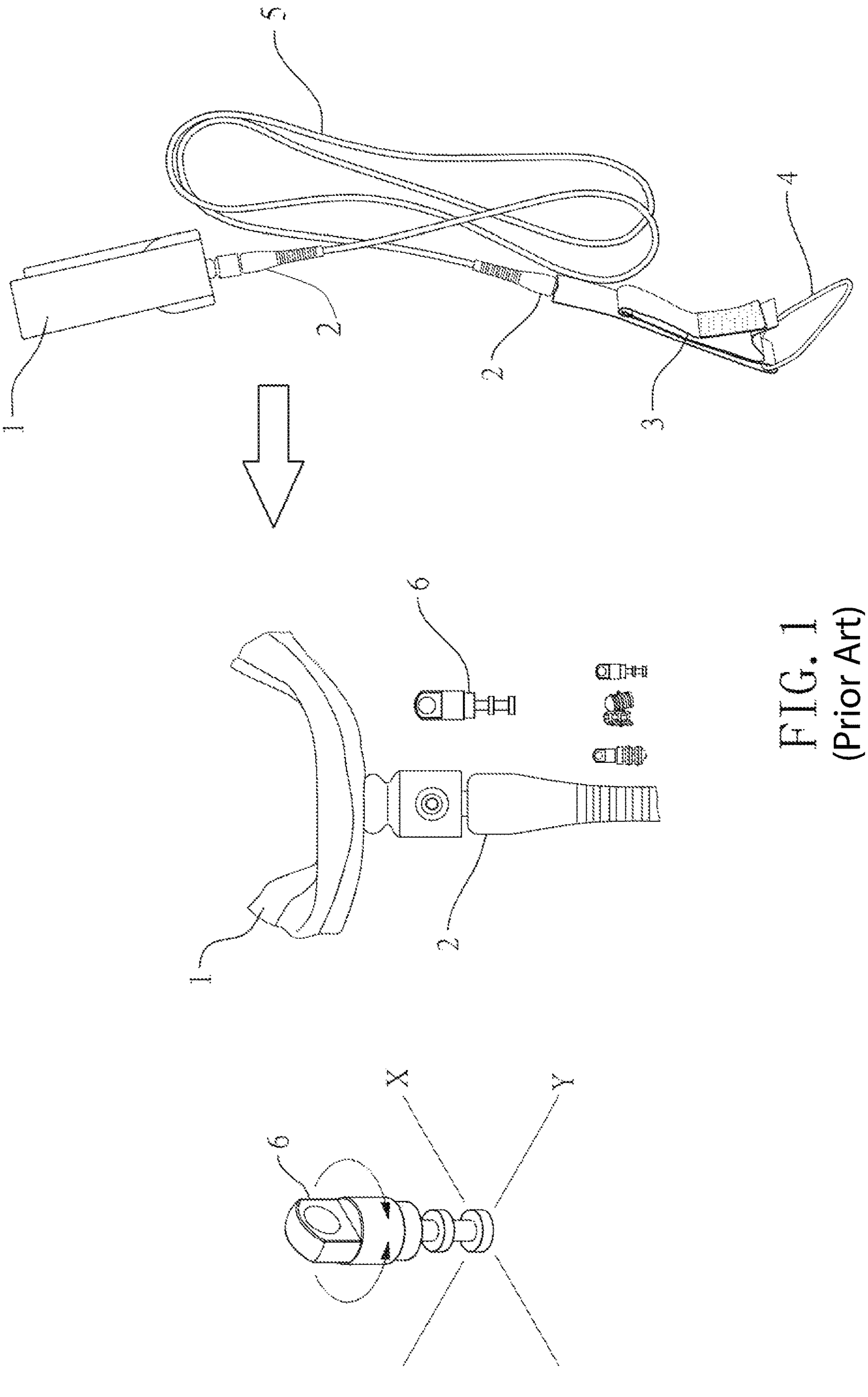
FIG. 1 (Prior Art)
FIG. 1 is a schematic diagram of the 2D plane rotational structure of the connector of the conventional leash.
Figure 4:
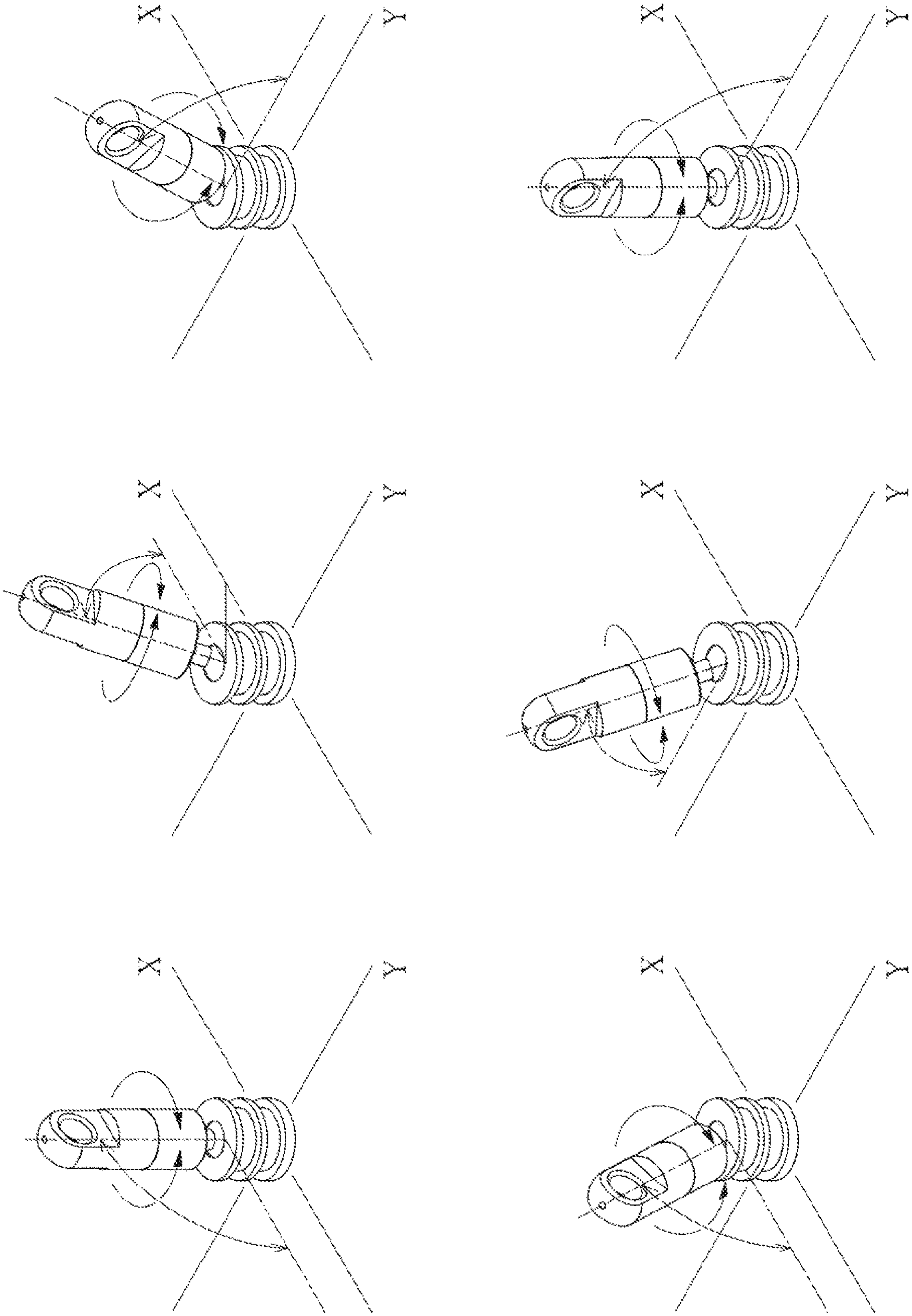
FIG. 4 is a schematic diagram illustrating the swivel joint of the leash rotating in three dimensions.

As shown in FIG. 4, FIG. 4 is a schematic diagram illustrating the swivel joint of the leash rotating in three dimensions. As shown in FIG. 1, the supporting bearing 6 has an oblate structure. Therefore, the supporting bearing 6 can only rotate in the two dimensional plane formed by the x-axis and the y-axis, and the supporting bearing 6 cannot rotate in the z-axis direction. This is, the supporting bearing 6 is not capable of the three-dimensional rotation. Please refer to FIG. 4, the first rotating handle 11 and the second rotating handle 21 respectively has an angle β (0 degrees≤angle β=180 degrees) with regard to the two dimensional plane formed by the x-axis and the y-axis. Therefore, the first rotating handle 11 and the second rotating handle 21 can swing in the z-axis direction. Since the first ball bearing 12 and the second ball bearing 22 are spherical, the first rotating handle 11 and the second rotating handle 21 can rotate clockwise or counterclockwise along their own axes. The structure can further make the first rotating handle 11 and the second rotating handle 21 rotate clockwise or counterclockwise along the two dimensional x-y axes plane at the same time by swinging the first rotating handle 11 and the second rotating handle 21 at different heights in the z-axis direction. In summary of the above, the swivel joint of the present invention overcomes the drawbacks in the prior art, where the connectors are not capable of rotating in three dimensions. Such that, the swivel joint may help the surfers to have a better sense of balance and may mitigate the instantaneous tension easily. Therefore, the surfers may experience more comfort.

The above description and explanation are only descriptions of the preferred embodiments of the present invention. Those with ordinary knowledge of this technology can make other modifications based on the patent scope defined below and the foregoing description. However, these modifications should be still regarded as the creative spirit of the present invention and be within the scope of the rights of the present invention.

What is claimed is:

1. A swivel joint of a leash, wherein one end of the leash connects to one end of a rope through a first connector, the other end of the rope connects to a rail protection band through a second connector, and the rail protection band is configured with a hooking string for hooking a surfboard, characterized in that the first connector comprises:

a first rotating handle, wherein one end of the first rotating handle is configured with a first ball bearing, and the other end of the first rotating handle is configured with a first fastening hole; and a first joint portion, wherein the first joint portion is configured with a cavity to accommodate the first ball bearing for rotating the first rotation handle in three dimensions, and a plurality of rings are configured around an outer side of the first joint portion.

2. The swivel joint for the leash as claimed in claim 1, wherein the second connector comprises:

a second rotating handle, wherein one end of the second rotating handle is configured with a second ball bearing, and the other end of the second rotating handle is configured with a second fastening hole; and a second joint portion, wherein the second joint portion is configured with a cavity therein to accommodate the second ball bearing for rotating the second rotation handle in three dimensions, and a plurality of rings are configured around an outer side of the second joint portion.

* * * * *